US006888093B2

(12) United States Patent
Hardwick

(10) Patent No.: US 6,888,093 B2
(45) Date of Patent: May 3, 2005

(54) APPARATUS FOR PROPER ALIGNMENT OF COMPONENTS IN A PLASMA ARC TORCH

(75) Inventor: Steven F. Hardwick, John's Island, SC (US)

(73) Assignee: Innerlogic, Inc., Charleston, SC (US)

(*) Notice: Subject to any disclaimer, the term of this patent is extended or adjusted under 35 U.S.C. 154(b) by 40 days.

(21) Appl. No.: 10/606,642

(22) Filed: Jun. 26, 2003

(65) Prior Publication Data

US 2004/0262270 A1 Dec. 30, 2004

(51) Int. Cl.[7] ................................................ B23K 10/00

(52) U.S. Cl. ............................ 219/121.53; 219/121.52; 219/121.48; 219/75

(58) Field of Search ......................... 219/121.5, 121.48, 219/121.51, 121.52, 74, 75, 121.59, 121.34, 121.45; 313/231.31, 231.41; 315/111.21

(56) References Cited

U.S. PATENT DOCUMENTS 5,624,586 A * 4/1997 Sobr et al. ............. 219/121.48
5,841,095 A * 11/1998 Lu et al. ................ 219/121.48
6,020,572 A * 2/2000 Marner et al. ......... 219/121.52
6,614,001 B2 * 9/2003 Hackett et al. ........ 219/121.59
2003/0034333 A1 * 2/2003 Horner-Richardson et al. .. 219/121.51

* cited by examiner

*Primary Examiner*—Mark Paschall
(74) *Attorney, Agent, or Firm*—Dority & Manning, P.A.

(57) ABSTRACT

A plasma arc torch includes a first consumable component having a longitudinally extending connection end. A second component in a coaxial relationship with the first consumable component has a bore defined therein into which the connection end of the first component extends. The bore includes a contact surface defined substantially perpendicular to a longitudinal axis of the torch. The connection end of the first component includes a contact shoulder defined substantially perpendicular to the longitudinal axis of the torch, a locking engagement section configured to engage with a corresponding section of the second component, and an alignment section extending longitudinally from the engagement section. The alignment section has a diameter closely matching that of the bore such so as to minimize axial misalignment between the first consumable component and the second component. The first consumable component may be an electrode.

27 Claims, 7 Drawing Sheets

APPARATUS FOR PROPER ALIGNMENT OF COMPONENTS IN A PLASMA ARC TORCH

BACKGROUND

The present invention relates generally to the field of plasma arc torches, and more particularly to a system and method for ensuring proper alignment of components within a plasma arc torch.

The operation of conventional plasma arc torches is well understood by those skilled in the art. The basic components of these torches are a body, an electrode mounted within the body, a nozzle defining an orifice for a plasma arc, a source of ionizable gas, and an electrical supply for producing an arc in the gas. Upon start-up, an electrical current is supplied to the electrode (generally a cathode) and a pilot arc is initiated in the ionizable gas typically between the electrode and the nozzle (the nozzle defining an anode). Then, a conductive flow of the ionized gas is generated from the electrode to the work piece, wherein the work piece then becomes the anode, and a plasma arc is thus generated from the electrode to the work piece. The ionizable gas can be non-reactive, such as nitrogen, or reactive, such as oxygen or air.

The precision of a cut made by a plasma arc torch is, in large part, a function of the axial alignment of key components of the torch, particularly the electrode and the nozzle. The most exact and precise cuts are obtained when the electrode insert is aligned coaxial with the centerline of the nozzle orifice. The generated arc is-centered in the nozzle orifice by the plasma gas. Thus, any misalignment between the insert and the nozzle orifice results in an axial cant ("skew") of the arc with respect to the torch centerline. The resulting arc thus does not cut exactly collinear with the torch centerline and the workpieces may have inaccurate dimensions or non-perpendicular edges.

An inherent drawback of plasma arc torches is that certain of the critical components wear out and must be replaced. Such components are commonly referred to as "consumable" components and include, for example, the electrode, nozzle, and swirl ring. Depending on the design of the torch, other components may also be subjected to wear and require periodic replacement. Unfortunately, the consumable components, particularly the nozzle and electrode, are made of expensive materials and must be machined to within relatively exact tolerances. Replacement of these consumable components represents a significant portion of the overall costs associated with plasma arc torch operations.

Upon-replacement of the consumable products, it is imperative for proper operation of the torch that such components are correctly seated and aligned within the torch. Also, the useful life of the consumable products is directly affected by proper alignment of the components. A misaligned component will not only result in an inaccurate cut as described above, but subjects the component to excessive wear, and will result in frequent replacement of the component.

In this regard, a significant effort has been made in the art towards systems and methods for improving proper alignment of components within a torch. For example, U.S. Pat. No. 6,424,082 and U.S. patent application No. 2002/0135283 A1 describe a system for improving component alignment by defining complimentary contoured surfaces between contacting components. The '082 patent and '283 application allege that systems relying on O-rings for centering components and compensating for machining tolerances are ineffective because of substantial inherent variations in the molded cross-sectional profiles of O-rings.

U.S. Pat. No. 5,841,095 describes a system for axially aligning components of a plasma arc torch by the use of springs disposed in the circumferential space between the components. The premise is that the springs will result in a self-centering of the components. However, such spring-type centering devices suffer from non-uniformity of applied pressure, especially for smaller diameter components. Such non-uniform pressure may actually cause axial and/or angular misalignment.

The present invention relates to an improved system for aligning components, particularly consumable components, in a plasma arc torch resulting in increased life of the components and improved operation of the torch.

SUMMARY

Objects and advantages of the invention will be set forth in part in the following description, or may be obvious from the description, or may be learned through practice of the invention.

In accordance with aspects of the invention, a plasma arc torch is provided having at least one, and typically more than one, consumable component. Such consumable components are known by those skilled in the art of plasma arc torches and may include, for example, an electrode, a nozzle, etc. The consumable component is disposed concentric relative to another component of the torch and the longitudinal centerline axis of the torch. It is important to correct operation of the torch and life of the components that the concentric and axial alignment with the torch centerline be precisely maintained.

According to an embodiment of the invention, the torch includes a first consumable component having a longitudinally extending connection end. A second component is in a coaxial relationship with the first consumable component and includes a bore, recess, or like opening defined therein into which the connection end of the first consumable component extends. In a particular embodiment, the first component constitutes an electrode and the second component is a cathode body into which an end of the electrode is seated. It should be appreciated, however, that the invention is not limited to any particular combination of components, and has utility for any combination of concentrically arranged components, particularly for components that should be aligned with the centerline axis of the torch. For example, in an alternate embodiment, the first component may be a nozzle and the second component may be an anode body.

The bore or recess into which the connection end of the first component is inserted has a contact surface defined substantially perpendicular to a longitudinal axis of the torch. This contact surface may be, for example, a shoulder defined at the mouth of the bore, or a shoulder defined internally of the bore. The longitudinally extending connection end of the first consumable component includes a contact shoulder or like structure defined substantially perpendicular to the longitudinal axis of the torch that is configured to abut directly against the contact surface of the second component. In this way, a parallel alignment of the axis of the first component with that of the second component and the centerline axis of the torch is ensured so long as the respective contact surfaces are perpendicular to the axis of the torch.

A locking engagement mechanism is configured between the connection end of the first component and the bore of the second component to draw the contact shoulder of the first component against the contact surface of the second component. In a particular embodiment, the engagement section is defined by mating threaded sections of the respective components such that the first component may be threadedly engaged with the second component. Other mechanical locking mechanisms may also be used, such as a luer fitting or the like, to draw and hold the components together.

The first component also includes an alignment section extending longitudinally from the engagement section. In a relatively simple embodiment, the engagement section is defined by a relatively smooth cylindrical extension. This extension desirably has a diameter closely matching that of the bore. For example, the respective diameters may be within about 0.001 to about 0.008 inches from each other. For example, for concentric components having a 0.001 inch diameter mismatch, a radial space or clearance between the components would be 0.0005 inches. Within machining tolerances, it is desirable to make the diameters as close as possible so that there is substantially zero angular “play” or mismatch between the axis of the components. Any degree of axial misalignment between the first consumable component and the second component is due to substantially only dimensional machining tolerances between the outer circumferential surface of the first component alignment section and the inner circumferential surface of the second component bore.

In one particular embodiment, the threaded engagement section of the first component is disposed adjacent the contact shoulder and between the alignment section and the contact shoulder. For example, the alignment section is defined at an end of the connection end and is inserted first into the bore. In an alternate embodiment, the alignment section may be disposed between the contact shoulder and the threaded engagement section. For example, the threaded section is defined at an end of the connection end and is inserted first into the bore.

A plasma arc torch in accordance with the invention may also include a centering mechanism in addition to that described above. One suitable such arrangement is described, for example, in co-pending U.S. patent application Ser. No. 10/375,291 filed Feb. 27, 2003 by the same inventor. The ’291 application is incorporated herein by reference for all purposes. The additional centering mechanism may include at least two concentric compressible components disposed circumferentially around a section of the first consumable component within a radial space between this section and another concentric component of the torch. The other component may be the second component, or a different component. A pressurized medium flow path is directed to a longitudinal location between the compressible components, wherein upon supply of a pressurized medium through the flow path, the compressible components are caused to deform radially outward against a concentric circumferential surface of the other component thereby further centering the first consumable component relative to the longitudinal centerline of the torch. In a particular embodiment, the compressible components are O-rings.

In one exemplary embodiment, the consumable component is disposed concentric within the other component and the radial space may be defined by an intentional machined difference in the respective outer and inner diameters of the components, or an inherent difference resulting from machining tolerances between the consumable component and the other concentric component.

The longitudinally spaced apart compressible components are disposed in the radial space. In a particular embodiment, the compressible components are O-rings, or similar devices. The compressible components may be positively seated in either component, for example in a concentric groove defined in an outer circumferential surface of the consumable component or an inner circumferential surface of the other concentric component. In a particular embodiment, two longitudinally spaced apart O-rings are seated in respective grooves in the outer circumferential surface of the consumable component. The O-rings are disposed against a wall surface, such as an end wall of a respective groove. The wall surface may have a depth or height equal to or greater than a radius of the O-rings. A partition may be defined between the grooves having a depth or height the same as the wall surface against which the O-rings are disposed, or may have a different height. For example, in one embodiment, the partition is defined simply as a circumferential-band of the exterior surface of the consumable component between two spaced apart O-ring grooves. In another embodiment, the partition may be a radially recessed area defined between O-ring seats so as to ensure a sufficient radial clearance between the two components.

A source of a pressurized medium is directed to the radial space between the compressible components. The pressurized medium may utilize the same type of gas as the ionizable gas used by the torch to create a plasma arc, or may be a different gas. The pressurized medium is at a sufficiently higher pressure than the ionizable gas to ensure deformation of the compressible components, as described in greater detail herein. The pressurized medium is directed by a flow path through one or more components of the torch to the radial space between the longitudinally spaced apart compressible components. For example, the pressurized medium flow path may include a port or channel through either component with an outlet between the spaced apart compressible components. In a particular embodiment, the compressible components are seated in grooves-around the consumable component and the outlet is defined in the other radially spaced concentric component between the compressible components.

Upon supplying the pressurized medium, the compressible components are pushed longitudinally against a wall surface and caused to deform radially outward against an opposite concentric surface of the adjacent torch component. This action results in a centering of the consumable component relative to the other component. For example, if the consumable component is concentric within the other component, it will be centered coaxially within the other component.

The present invention also encompasses individual consumable components for use in a plasma arc torch. The consumable component is configured for receipt within a plasma arc torch in a concentric relationship with at least one other component of the torch. For example, the invention includes an electrode having a connection end configured thereon as described above for insertion into a cathode body of a plasma arc torch. Although not necessary, the electrode may include an additional centering-system. For example, the electrode may include an outer circumferential surface having a radius along at least a longitudinal portion thereof such that a radial space is defined between the outer circumferential surface and another component of the torch upon insertion of the electrode within the torch. Longitudinally spaced apart compressible components are disposed around the outer circumferential surface of the consumable component against a radial wall surface defined in the outer circumferential surface. The compressible components may be, for example, O-rings seated in grooves defined in the outer surface of the consumable component. A flow path for a pressurized medium is defined between the compressible components. The compressible components have a size and compressibility such that upon being subjected to a pressurized medium introduced to the flow path, the compressible components are pushed longitudinally against the wall surface and are caused to deform radially outward so as to hold the consumable component in position relative to the other concentric torch component.

Aspects of the invention will be described below in greater detail by reference to particular embodiments illustrated in the figures.

DETAILED DESCRIPTION

Reference will now be made in detail to embodiments of the invention, one or more examples of which are illustrated in the figures. Each embodiment described or illustrated herein is presented for purposes of explanation of the invention, and not as a limitation of the invention. For example, features illustrated or described as part of one embodiment may be used with another embodiment to yield still a further embodiment. It is intended that the present invention include these and, other modifications and variations.

Figure 1:
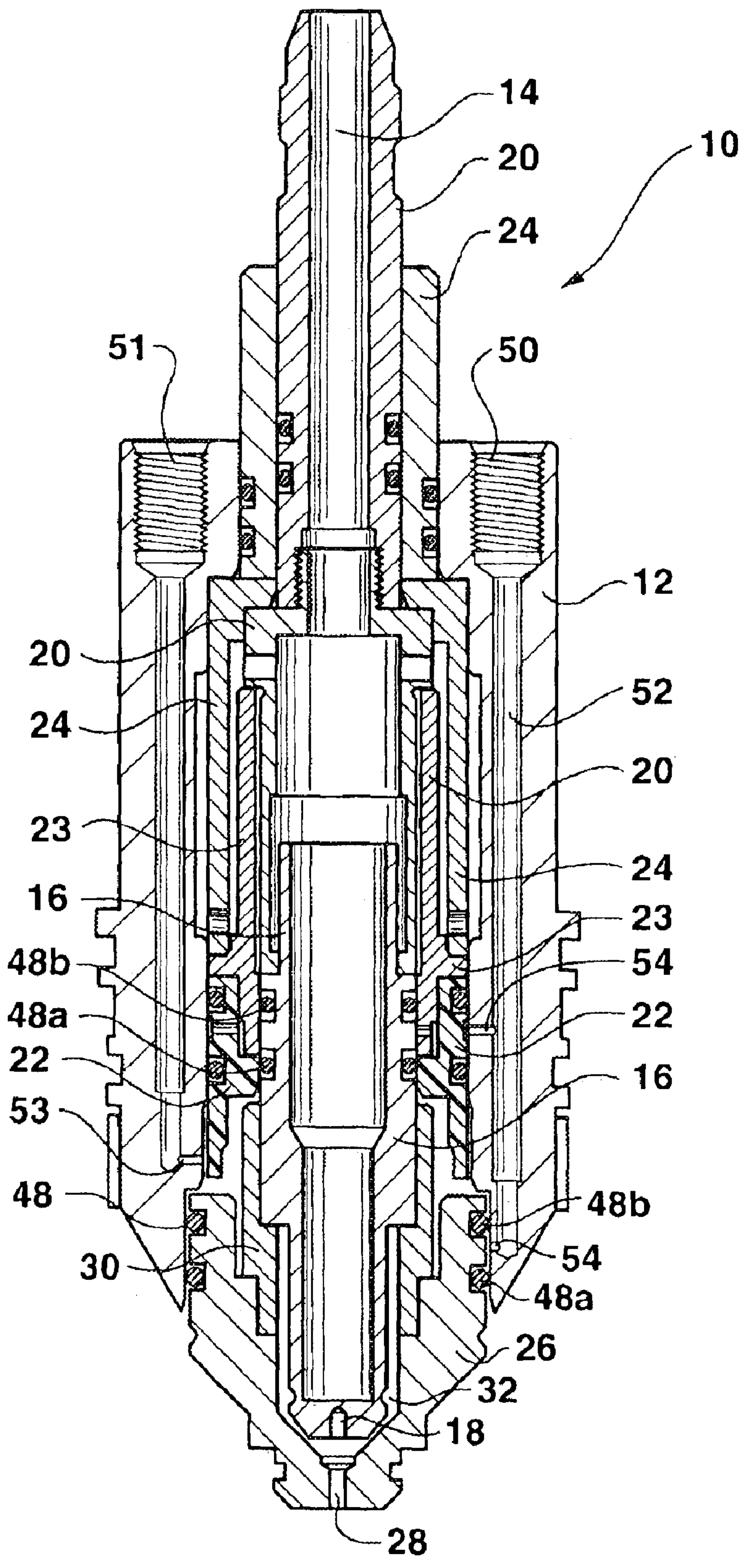
FIG. 1 is a cross-sectional view of an embodiment of a plasma arc torch in accordance with the invention.
Figure 4:
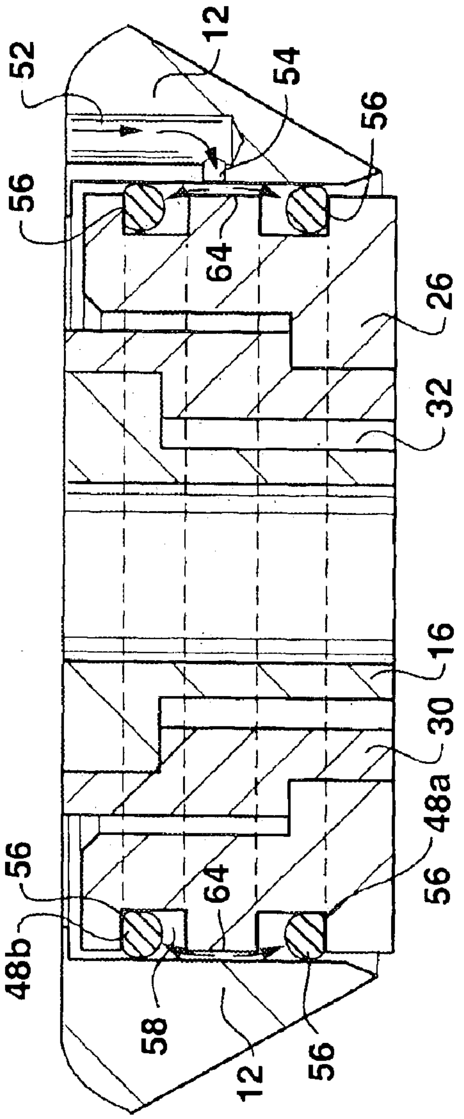
FIG. 4 is an enlarged cross-sectional view of the portion of the torch indicated in FIG. 2.
Figure 5:
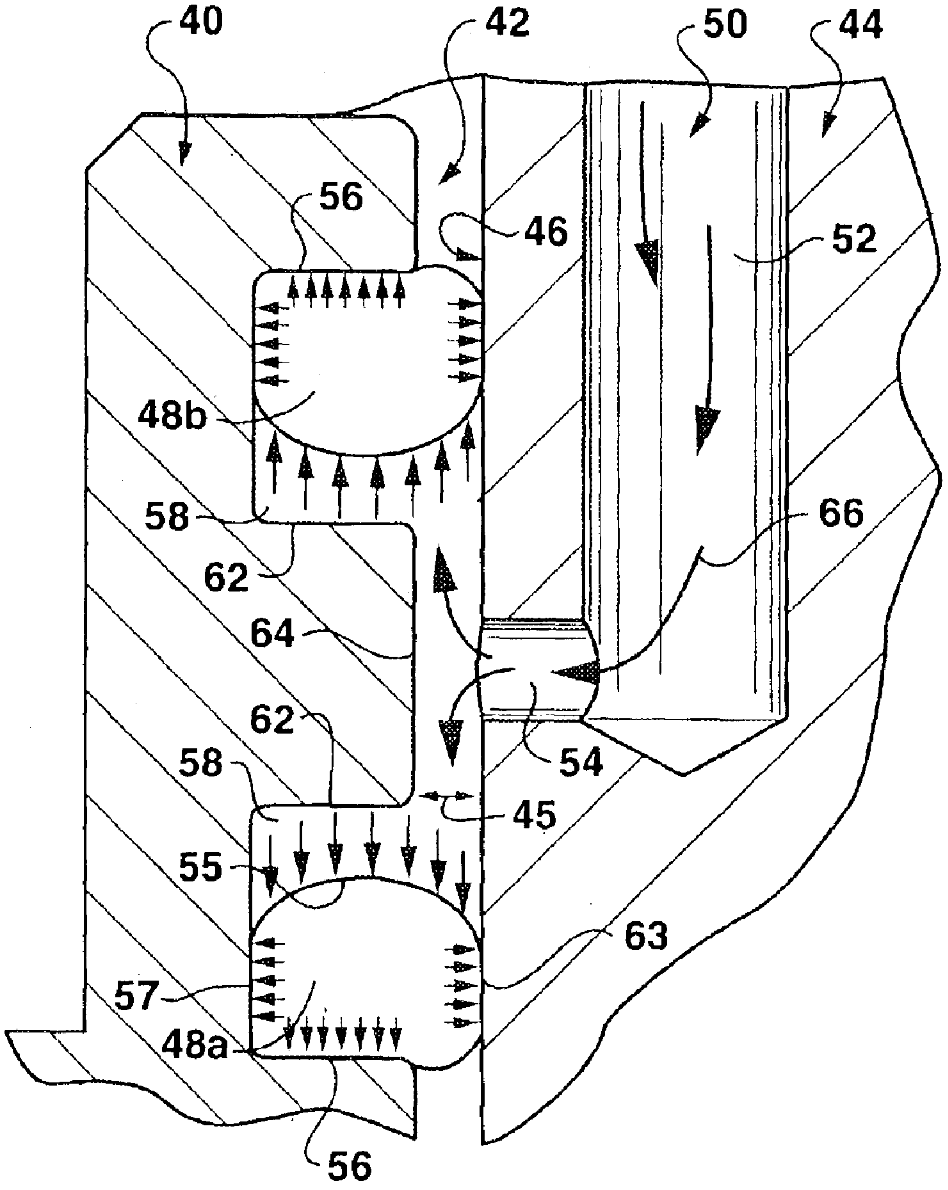
FIG. 5 is a conceptual operational view of the compressible components is accordance with the invention.
Figure 6:
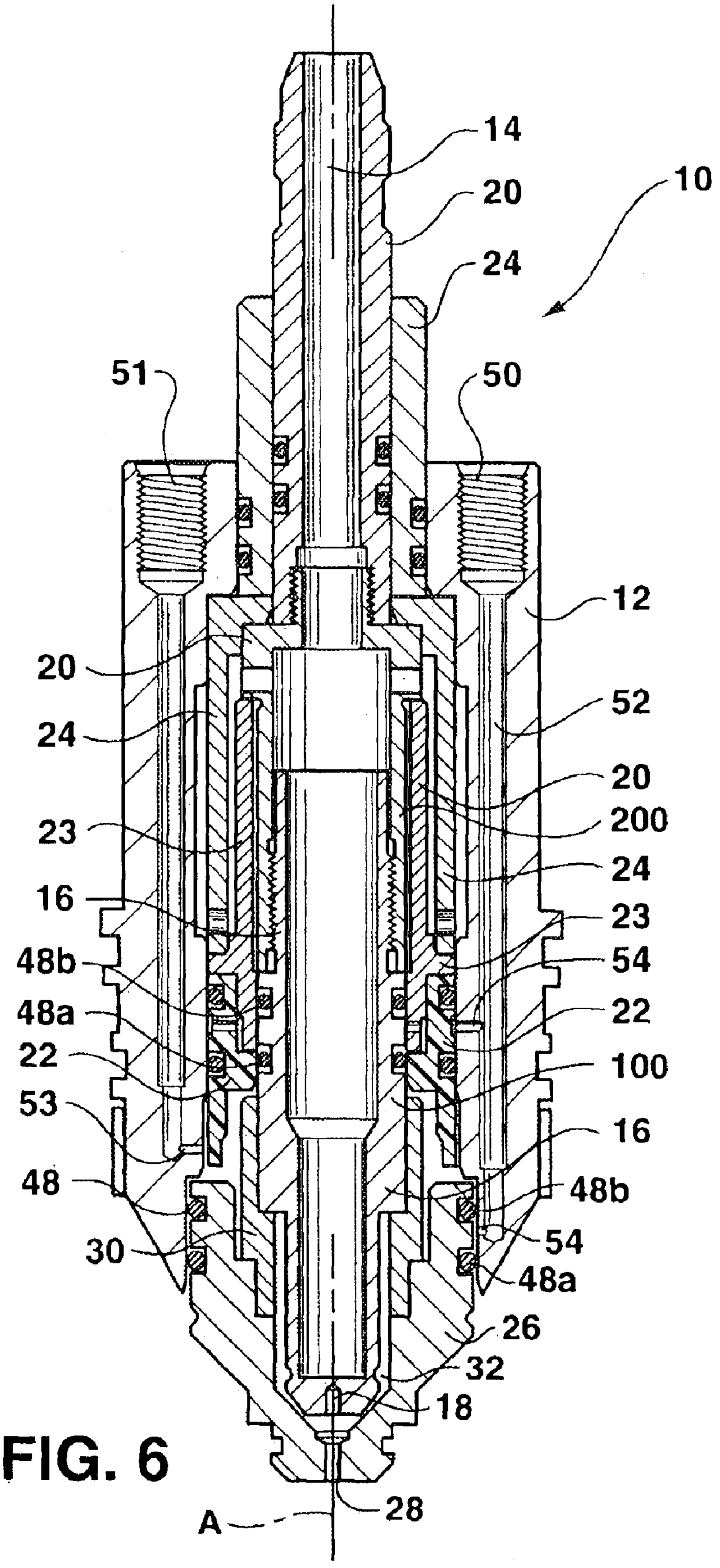
FIG. 6 is a cross-sectional view of an embodiment of a plasma arc torch in accordance with the invention.
Figure 7:
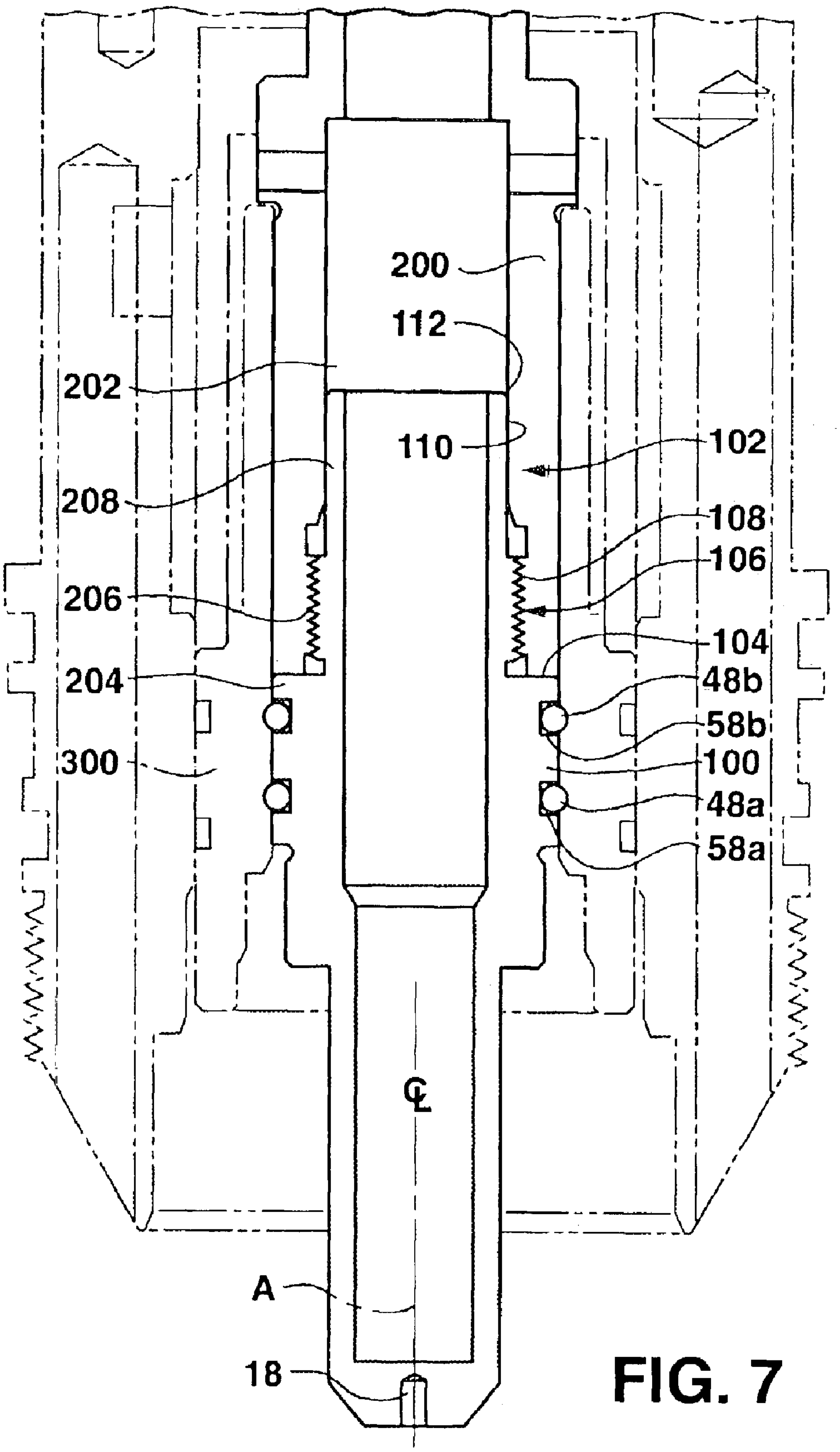
FIG. 7 is an enlarged cross-sectional view of portions of the embodiment illustrated in FIG. 6.
Figure 8:
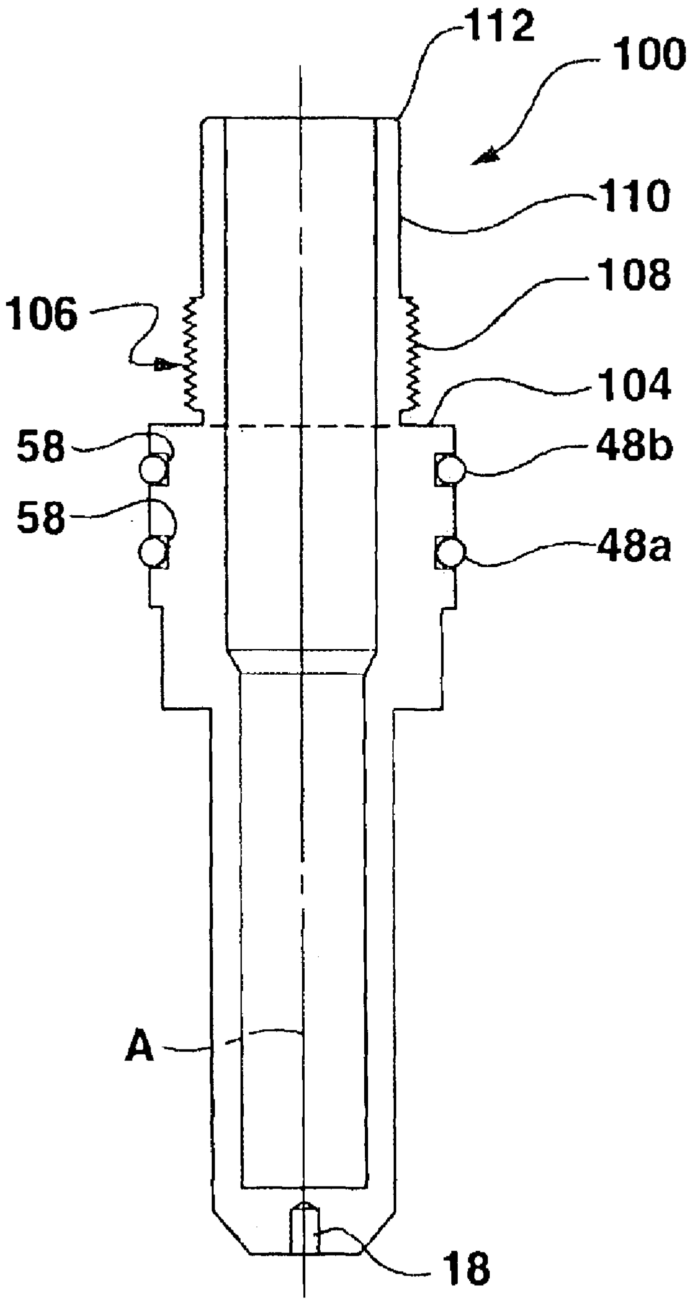
FIG. 8 is an a cross-sectional view of an electrode element in accordance with the invention.

FIGS. 1 and 6 are cross-sectional views of a plasma arc torch 10 incorporating aspects of the present invention. Similar components are numbered with the same reference characters in the figures. FIGS. 1 through 5, and the related description thereof, relate to a plasma arc torch incorporating a unique component centering mechanism as described in the co-pending U.S. patent application Ser. No. 10/375,291. As mentioned, the '291 application is incorporated herein by reference for all purposes. FIGS. 6 through 8 relate to features of the present alignment and centering system that may be incorporated with the system of FIGS. 1 through 5, or may be used alone in a plasma arc torch in accordance with the invention. General aspects of plasma arc torches will be discussed first.

The torch 10 in its overall construction and operation is similar to a commercially available torch (FL 200) available from InnerLogic, Inc. of Charleston, S.C., USA. It should be appreciated, however, that the present invention for centering and aligning components within a plasma arc torch is not limited to any particular type of torch, and may be practiced by any manner of conventional torch, including torches of the type described in U.S. Pat. No. 5,070,227.

The operation of conventional arc torches is well understood by those skilled in the art and a detailed explanation thereof is not necessary for purposes of this disclosure. General structural and operational aspects of conventional arc torches are described below as reference and background for the present invention.

Referring to FIGS. 1 and 6, the plasma arc torch 10 has a body 12 that initially functions as an anode body in an arc pilot mode of the torch. The body 12 includes a water-cooling passage or chamber 14 that is supplied with a source of cooling water (not shown). An ionizable gas passage 51 is defined in the body 12 to supply a pressurized ionizable gas to the torch components. Typically, a remotely actuated valve, such as a solenoid valve, is disposed inline between the passage 51 and a pressurized gas source to shut off the supply of gas to the torch 10 upon actuation of the valve. As is appreciated by those skilled in the art, the plasma gas may be non-reactive, such as nitrogen, or reactive, such as oxygen or air.

The torch body 12 includes an electrode 16, typically formed from copper. An electrode insert or element 18 is fitted into the lower end of the electrode 16. The insert 18 is typically formed from hafnium or zirconium, particularly when a reactive gas is used as the plasma gas.

A cathode element 20 surrounds or defines the chamber 14. A rear insulating body component 24 surrounds a longitudinal portion of the cathode 20. Front insulating body components 22, 23 surround a longitudinal portion of the electrode 16, as depicted in FIG. 1 and understood by those skilled in the art.

A nozzle 26 is disposed at the forward end of the electrode 16 and defines an arc passageway 28 aligned with the electrode insert element 50.

A swirl ring 30 is disposed around a lower portion of the electrode 16 and has holes (not shown) defined therein to induce a swirling component to the plasma gas entering a plasma gas chamber 32 defined in the radial space between the nozzle 26 and electrode 16.

Certain outer structural components of the torch 10 are not illustrated in FIG. 1 for sake of clarity. These components are not critical to an understanding of the present invention and include, for example, a retaining cap assembly that fits over the nozzle 26, and a shield that fits over the retaining cap assembly. A handle adapter may be fitted over the retaining cap assembly, and so forth.

In operation, electrical current is supplied by a power supply to the electrode 16 and insert element 18. A negative power lead is in electrical communication with the cathode 20. In a pilot arc mode, a positive power lead is in electrical communication with the anode body 12 which is electrically isolated by the insulating bodies 22, 23, 24 from the cathode 20. A positive power lead is connected to a work piece that is to be cut by the torch. In operation, plasma gas flows from a source and into the passage 51. The plasma gas flows downward through the passage 51 and is directed through an outlet 53 to the plasma gas chamber 32. In operation, a differential pressure exists between the supply passage 51 and plasma gas chamber 32 so that the plasma gas flows from the supply passage 51, through the swirl ring 30, and out the passageway 28 defined in the nozzle 26 with a swirling component induced thereto.

In the pilot arc mode, the positive lead is connected to the anode body 12 and a pilot arc is initiated between the electrode insert 18 and nozzle 26. A desired plasma gas flow and pressure are set by the operator for initiating the pilot arc. The pilot arc is started by a spark or other means, such as a contact starting technique, all of which are known in the art.

In order to transfer the torch to a cutting mode, the torch is brought close to a work piece so that the arc transfers to the work piece, at which time positive power is supplied only to the work piece. Current is increased to a desired level for cutting such that a plasma arc is generated which extends through the arc passageway 28 to the underlying work piece. As the operational current is increased, the plasma gas within the plasma gas chamber 32 heats up and a decrease in plasma gas flow out of the nozzle 26 results. In order to sustain sufficient plasma gas flow through the nozzle 26 to sustain the plasma arc, pressure of the plasma gas supplied must be increased with the increase of current.

The operational principles described above are understood by those skilled in the art and a further detailed explanation thereof is not necessary for purposes of the present disclosure.

FIGS. 6 through 8 conceptually illustrate aspects of a centering system for components of the torch that may be used alone or combined with another type of system, as shown in the figures. This system has utility for properly aligning and centering various components, and the invention is not limited to any particular component or combination of components. The component may be any component within the plasma arc torch that must be coaxially centered and aligned with another component and the longitudinal centerline axis of the torch. In the embodiment illustrated in FIGS. 6 through 8, the component is an electrode 16 with an insert element 18. As described above and well understood by those skilled in the art, it is important for proper operation of the torch and useful life of the components that the axis of the electrode and insert is coaxial with that of the torch 40, and particularly the arc passageway 28 (nozzle orifice).

Still referring to FIGS. 6–8, the torch 10 includes a first consumable component, for example the electrode 100, having a longitudinally extending connection end 102. A second component, for example the cathode body 200, is in a coaxial relationship with electrode 100 and includes a bore, recess, or like opening 202 defined therein into which the connection end 102 of the electrode 100 extends. It should be appreciated that the electrode and cathode body are merely examples of a suitable combination. Other combinations are within the scope and spirit of the invention. For example, the first component may be the nozzle 26 and the second component may be an anode body. The bore 202 has a contact surface 204 defined substantially perpendicular to a longitudinal centerline axis "A" of the torch. This contact surface 202 may be, for example, a shoulder defined at the mouth of the bore 202 as illustrated, or like structure defined internally of the bore 202.

The longitudinally extending connection end 102 of the electrode 100 includes a contact surface or shoulder 104 defined substantially perpendicular to the longitudinal axis A of the torch. The shoulder 104 is configured to abut directly against the contact surface 204 of the cathode body 200. So long as the respective contact surfaces 104, 204 are essentially perpendicular to the axis A of the torch, a parallel alignment of the axis of the electrode 100 with that of the cathode body 200 and the axis A is obtained.

A locking engagement mechanism is configured between the connection end 102 of the electrode 100 and the bore 202 of the cathode body 200 to draw the contact shoulder 104 of the electrode 100 against the contact surface 204 of the cathode body. A suitable engagement mechanism may be, for example a locking engagement section 108 defined on the connection end 102 that releasably engages with a complimentary section 206 defined within the bore 202. For example, both sections 108 and 206 may include threads for a threaded engagement between the components. Alternatively, a luer type connection, or similar device, may be used.

The connection end 102 of the electrode 100 also includes an alignment section 110 extending longitudinally from the engagement section 106. In the illustrated embodiment, the alignment section 110 is defined by a smooth walled cylindrical extension. This extension may have an angled or tapered end 112, as particularly seen in FIG. 8, to aid in insertion of the section 110 into bore 202. A five degree taper may be suitable for this purpose. This extension desirably has a diameter smaller than the diameter of the engagement section 106. For example, as illustrated in the figures the cylindrical extension 110 has a diameter smaller than that of the threaded engagement section 106.

The extension 110 slides into a corresponding section 208 of the bore 202 rearwardly of the threaded section 206, as particularly seen in FIG. 7. The bore section 208 has an inner diameter that closely matches that of the outer diameter of the extension 110. It is desirable that the diameters match as close as machining tolerances will permit while allowing relative longitudinal sliding movement between the extension 110 and bore section 208. Ideally, the extension will slide within the bore section 208 with zero angular "play" between the components. Angular play from differences between the diameters could result in angular deviations between the torch centerline A and the electrode centerline, it being recognized that the threaded sections 108 and 206 would limit the amount of angular play. However, the machining tolerances for threads is significantly harder to control, and finer pitch threads are significantly harder to machine and are susceptible to damage. Applicant has found that an electrode extension 110 and bore section 208 can be machined with dimensional diameter tolerances within about 0.001 to about 0.008 inches.

In the illustrated embodiment, the threaded engagement section 108 of electrode connection end 102 is disposed adjacent the contact shoulder 104 and between the alignment section 110 and the contact shoulder 104. The engagement section 108 may be directly adjacent the shoulder 104, or longitudinally spaced from the shoulder 104. In an alternate embodiment not illustrated in the figures, the relative positions of the engagement section 108 and alignment section 110 may be reversed, with the alignment section 110 having a larger diameter than the engagement section 108. For example, the alignment section is defined at an end of the connection end and is inserted first into the bore. In an alternate embodiment, the alignment section may be disposed between the contact shoulder and the threaded engagement section. For example, the threaded section is defined at an end of the connection end and is inserted first into the bore.

As mentioned, a plasma arc torch 10 in accordance with the invention may also include a centering mechanism in addition to that described above, particularly the compressible component system described in co-pending U.S. patent application Ser. No. 10/375,291. In the embodiment of FIG. 7, compressible O-rings **48*a* and 48*b* are disposed in respective grooves 58*a* and 58*b* around a section of the electrode 100 forward of the shoulder 104. The compressible components 48*a* and 48*b* aid in centering the electrode relative to the concentric insulating member 300. The configuration and operation of the compressible component centering devices is described in greater detail below through reference to FIGS. 1 through 5**.

FIG. 8 is an illustration of the electrode 100 standing alone. It should be appreciated that the invention is intended to separately encompass the respective components utilizing the unique centering system. The features of the electrode 100 are described above.

Referring to FIG. 5 in particular, the component 40 (which may correspond to a section of the electrode 100),has a first longitudinally disposed circumferential surface; a portion of this-surface illustrated in FIG. 5 as element 42. A portion of a second component 44 (which may correspond to the insulating member 300) is also illustrated in FIG. 5 radially displaced by a distance 45 from the consumable component 40. The second component has a longitudinally extending surface 46 that is coaxial to the longitudinally extending surface 42 of the consumable component 40. The component 44 may be any component of the plasma arc torch that is in coaxial alignment with the consumable component 40. For example, in the embodiment wherein the consumable component 40 is the nozzle 26 (FIG. 1), the component 44 may be designated as the anode body 12, as is particularly illustrated in FIG. 1.

Still referring to FIG. 5, at-least two compressible components 48*a*, 48*b* are disposed in the radial space 45 between the first and second longitudinally extending surfaces 42, 46, of the respective consumable component 40 and other component 44. The compressible components 48*a*, 48*b*, are longitudinally spaced apart and may be, for example, conventional O-rings, gasket-like devices, etc. A feature of the compressible components 48*a*, 48*b*, is that they are capable of deforming under pressure so as to expand radially outward into the radial space 45 between the consumable component 40 and other component 44, as described in greater detail below.

It should be appreciated that the compressible components 48*a*, 48*b*, may be positively seated in either of the components 40 or 44. In the illustrated embodiment, the compressible components 48*a*, 48*b*, are positively seated in grooves 58 defined circumferentially around the consumable component 40.

A pressurized medium flow path, generally 50, is provided so as to direct a pressurized medium to the radial space 45 at a longitudinal location between the compressible components 48*a*, 48*b*, as particularly illustrated in FIG. 5. In a particular embodiment, the pressurized medium flow path 50 may be defined, for example, by a passage 52 defined in the component 44. The passage 52 includes an outlet 54 located in the longitudinal surface 46 between the compressible components 48*a*, 48*b*. A pressurized medium 66 is thus directed through the passage 52 and out of the outlet 54 so as to flow longitudinally in the radial space 45, as is conceptually illustrated in FIG. 5. Referring to FIG. 1, the pressurized medium flow path 50 is illustrated as the passage 52 defined longitudinally within the anode body 12. A threaded fitting is illustrated as one means of connecting the pressurized medium flow path 50 with a source of pressurized gas.

The pressurized medium 66 is preferably a gas maintained at a pressure higher than the ionizable gas utilized by the torch 10. The gas 66 may be the same type of gas as the ionizable gas, or a different gas.

Still referring to FIG. 5, it can be seen that the compressible components 48*a*, 48*b* are seated so as to be in contact with a wall 56 or other like structure so that upon the pressurized medium 66 being directed into the radial space 45, the gas causes the compressible components 48*a*, 48*b*, to be forced against the respective walls 56 and to deform radially outward. The compressible components 48*a*, 48*b* will compress and deform to such an extent that a seal line 63 is established against the coaxial surface 46 of the component 44. Once an equilibrium is established, it should be appreciated that the compressible components 48*a*, 48*b*, thus serve to uniformly center and align the consumable component 40 coaxially within the other component 44 of the torch 10. It should be appreciated that the compressible components 48*a*, 48*b*, should have the same compressibility or hardness so that the centering force is generated equally at each longitudinally displaced position of the components 48*a*, 48*b*. It should also be appreciated that the pressurized medium 66 should be at a sustained pressure to ensure that a sufficient differential pressure is established across the compressible components 48*a*, 48*b*, to cause the components to deform to the desired extent. This differential pressure will be a function of the ionizable gas pressure and the hardness characteristics, of the compressible components 48*a*, 48*b*, and may be empirically determined.

In the illustrated embodiments, the walls 56 against which the compressible components 48*a*, 48*b*, are pushed, are defined by distal walls of the groove 58. These distal walls 56 preferably have a depth that is at least as great as the relaxed radius of the compressible components 48*a*, 48*b*. Referring to the component 48*a* in FIG. 5, as the pressurized gas 66 is directed longitudinally within the radial space 45, the component 48*a* is acted upon at its proximal surface 55 by the gas 66 and is pushed in the direction of the wall 56. Because of the reaction surface 56 and reaction surface 57 defined by the floor of the groove 58, deformation of the component 48*a* is directed radially outward into the radial space 45. It should also be appreciated that the reaction surfaces or wall-like structures may also be defined by radially protruding ribs or ridges that are defined on the exterior circumferential surface of the component 40. In other words, the illustrated grooves are a suitable convenient method for positively seating the components 48*a*, 48*b*, but other embodiments are within the scope and spirit of the invention.

Still referring to FIG. 5, a partition 64 may be provided between the grooves 58. This partition 64 may have a depth that is generally equal to the distal walls 56 of the grooves 58, or may have a depth that is less than or greater than the height of the walls 56. In the illustrated embodiment, the partition 64 is defined by a longitudinal portion of the circumferential surface of the component 40. This surface may, however, be machined so that the radial space 45 is increased longitudinally between the compressible components 48*a*, 48*b*. This may be desired depending on the machine tolerances between the components 40, 44 to ensure that a sufficient radial space 45 is defined.

Figure 2:
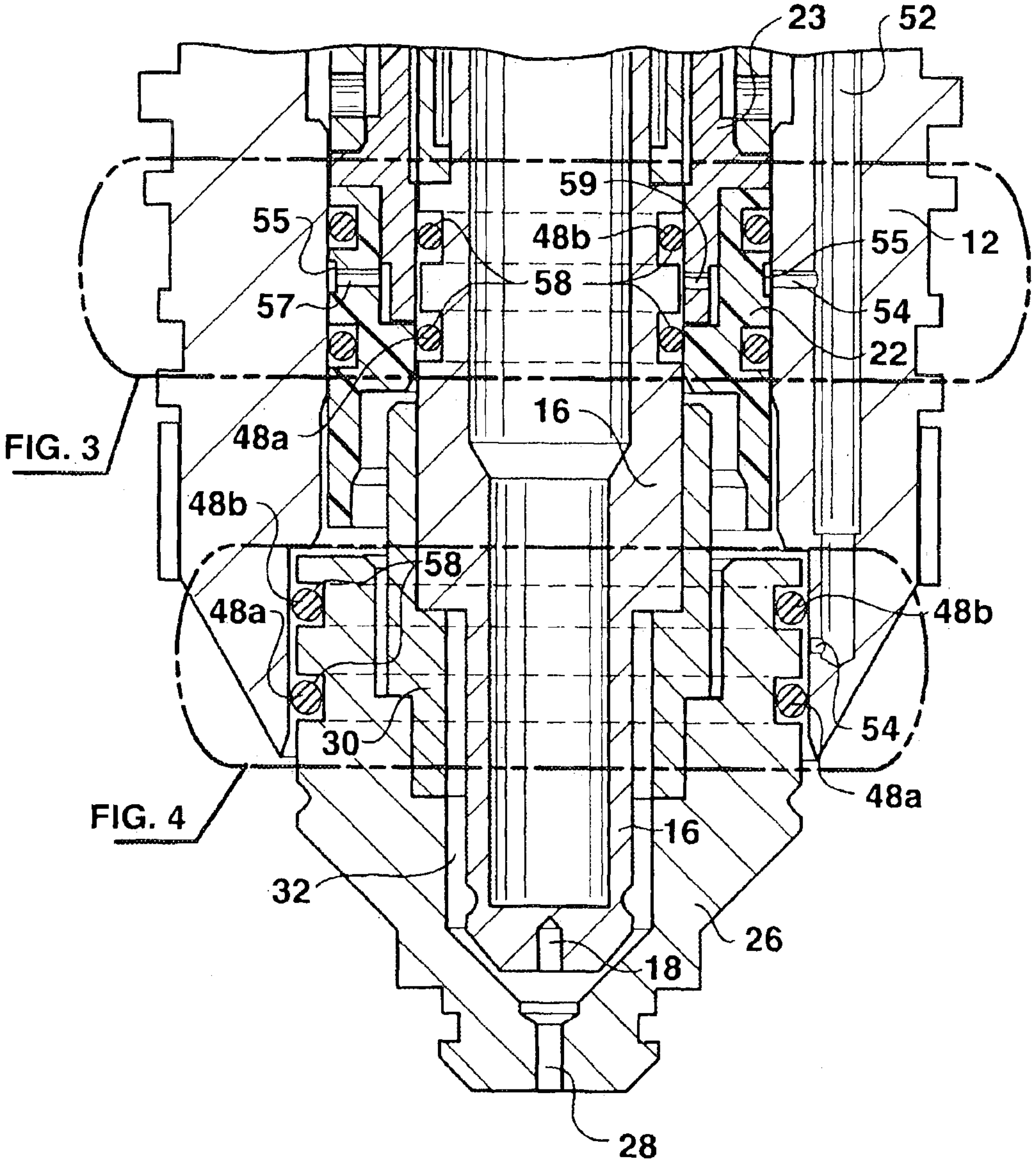
FIG. 2 is an enlarged cross-sectional view of portions of the embodiment illustrated in FIG. 1.
Figure 3:
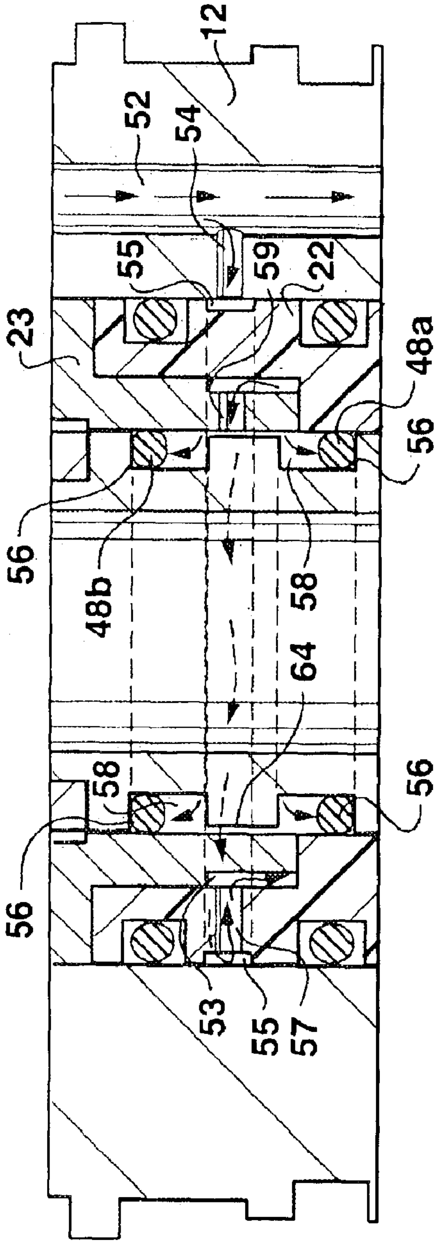
FIG. 3 is an enlarged cross-sectional view of the portion of the torch indicated in FIG. 2.

FIG. 1 is an embodiment incorporating the conceptual features illustrated in FIG. 5 for centering and aligning the nozzle 26 relative to the anode body 12, and also for centering and aligning the electrode 16 with respect to the insulating body 22. Details of the centering and aligning systems are shown in FIGS. 2 through 4. Both of these systems may be incorporated with the system of FIGS. 6–8 in a torch according to the present invention.

Referring to FIGS. 2 and 4, the system for centering and aligning the nozzle 26 with respect to the anode body 12 includes grooves 58 defined in the outer circumferential surface of the nozzle 26. The compressible components 48*a*, 48*b*, are seated within the grooves 58. This can be particularly seen in FIG. 4, the outlet 54 from the pressurized medium passage 52 is directed to the longitudinally extending radial space between the grooves 58. Upon supplying the pressurized medium 66, the compressible components 48*a*, 48*b*, are deformed as described above resulting in a relatively precise coaxial centering of the nozzle 26 with respect to the anode body 12.

FIGS. 2 and 3 illustrate an exemplary centering and aligning system between the electrode 16 and the insulating body member 22. In this particular embodiment, the pressurized medium is directed from the passage 52 into an outlet 54. The outlet 54 is in communication with a concentric recess or groove 55 defined in the outer circumferential surface of the insulating body 22. As particularly seen in FIG. 3, the circumferential passage 55 is in communication with a radially extending passage 57 also defined in the insulating body 22. Passage 57 opens into a circumferential recess or passage 53 defined in the outer circumferential surface of the coaxial insulating body 23. A further radially directed outlet 59 is in communication with this passage 53 and serves to direct the pressurized medium into the longitudinally extending radial space defined between the compressible components 48*a*, 48*b*. In this particular embodiment, the partition 64 is illustrated as being machined with a radial depth slightly less than the distal walls 56 of the grooves 58 to ensure a sufficient radial clearance for the pressurized medium to act upon the compressible components 48*a*, 48*b*, as described above.

It will be apparent to those skilled in the art, that the unique centering and aligning system as described herein may be useful for proper positioning and alignment of any component within the torch 10. The invention, however, has particular usefulness for centering and aligning consumable components in that the life of such components may be significantly extended. For example, the invention may be used to prevent misalignment between the electrode and cathode body as described above, or between the nozzle and an anode body. Without proper alignment between such components, the arc spot would not be centered on the hafnium element insert, resulting in substantially increased wear of the copper electrode casing. Thus, with the present invention, the frequency of replacement of these relatively expensive components is reduced and the overall cost of operating plasma arc torches is also reduced.

It will be apparent to those skilled in the art that modifications and variations can be made to the embodiments illustrated and described herein without departing from the scope and spirit of the invention as set forth in the appended claims and their equivalents.

What is claimed is:

1. A plasma arc torch, comprising:

a first consumable component, said consumable component having a longitudinally extending connection end;

a second component in a coaxial relationship with said first consumable component, said second component having a bore defined therein into which said longitudinally extending connection end extends, said bore including a contact surface defined substantially perpendicular to a longitudinal axis of said torch;

said longitudinally extending connection end of said first consumable component comprising a contact shoulder defined substantially perpendicular to the longitudinal axis of said torch, a locking engagement section configured to engage with said second component and draw said contact shoulder against said contact surface of said second component, and an alignment section extending longitudinally from said engagement section; and said alignment section having a diameter closely matching that of said bore such that substantially any degree of axial misalignment between said first consumable component and said second component is due to dimensional machining tolerances between an outer circumferential surface of said alignment section and an inner circumferential surface of said bore.

2. The plasma arc torch as in claim 1, wherein said locking engagement section comprises a threaded engagement section between said connection end and said bore, and wherein threads of said threaded engagement section have a pitch so as to allow for insertion of said alignment section into said bore.

3. The plasma arc torch as in claim 2, wherein said threaded engagement section is disposed adjacent said contact shoulder and between said alignment section and said contact shoulder.

4. The plasma arc torch as in claim 1, wherein said dimensional tolerance is a difference of about 0.001 to about 0.008 inches in the diameters of the first consumable component and the second component.

5. The plasma arc torch as in claim 1, wherein said first consumable component comprises an electrode and said second component comprises a cathode body.

6. The plasma arc torch as in claim 1, wherein said first consumable component comprises a nozzle and said second component comprises an anode body.

7. The plasma arc torch as in claim 1, further comprising at least two concentric compressible components disposed circumferentially around said first consumable component and between said first consumable component and another concentric component of said torch, and a pressurized medium flow path directed to a longitudinal location between said compressible components, wherein upon supply of a pressurized medium through said flow path, said compressible components are caused to deform radially outward thereby further centering said first consumable component relative to the longitudinal centerline of said torch.

8. The plasma arc torch as in claim 7, wherein said compressible components comprise O-rings.

9. The plasma arc torch as in claim 7, wherein said consumable component is concentric within said other concentric component.

10. The plasma arc torch as in claim 9, wherein said other concentric component is a different component than said second component.

11. The plasma arc torch as in claim 7, wherein said contact shoulder is disposed between said components and said locking engagement section.

12. The plasma arc torch as in claim 7, wherein each of said compressible components is seated in a respective groove, said grooves having opposite side walls of generally equal depth.

13. The plasma arc torch as in claim 8, wherein said side walls have a depth at least as great as a radius of said compressible components.

14. A plasma arc torch, comprising:

a electrode having a longitudinally extending connection end; a cathode body in a coaxial relationship with said electrode, said cathode body having a bore defined therein into which said electrode connection end extends, said bore including a contact surface defined substantially perpendicular to a longitudinal axis of said torch and a threaded section;

said electrode connection end comprising a contact shoulder defined substantially perpendicular to the longitudinal axis of said torch, a threaded engagement section configured to engage with said threaded section of said cathode body to draw said contact shoulder against said contact surface, and an alignment section extending rearwardly from said threaded section; and said alignment section having a diameter closely matching that of said bore such that axial misalignment between said electrode and said cathode body is minimized.

15. The plasma arc torch as in claim 14, wherein said diameter of said alignment section is within about 0.001 to about 0.008 inches of a diameter of said bore.

16. The plasma arc torch as in claim 14, wherein said threaded engagement section has a diameter greater than said alignment section.

17. The plasma arc torch as in claim 14, wherein said threaded engagement section is disposed adjacent said contact shoulder and between said alignment section and said contact shoulder.

18. The plasma arc torch as in claim 14, further comprising at least two concentric compressible components disposed circumferentially around said electrode at a location longitudinally spaced from said connection end, and a pressurized medium flow path directed to a longitudinal location between said compressible components, wherein upon supply of a pressurized medium through said flow path, said compressible components are caused to deform radially outward thereby further centering said electrode relative to the longitudinal centerline of said torch.

19. The plasma arc torch as in claim 18, wherein said compressible components are disposed around a location of said electrode that is concentric with at least one insulating body of said torch.

20. The plasma arc torch as in claim 19, wherein said compressible components comprise O-rings.

21. An electrode component for use in a plasma arc torch, said electrode comprising:

an insert end and an opposite connection end; said connection end insertable into a bore in a cathode body and comprising a contact shoulder defined substantially perpendicular to a longitudinal axis of said torch, a threaded engagement section disposed rearwardly of said contact shoulder and configured to engage with a corresponding threaded section of the cathode body, and a longitudinally extending alignment section extending rearwardly from said threaded section; and wherein said alignment section has a diameter less than that of said threaded section and closely matching that of the cathode body bore such that when said electrode is inserted into the cathode body, axial misalignment between said electrode and said cathode body is minimized.

22. The electrode as in claim 21, wherein said diameter of said alignment section is within about 0.001 to about 0.008 inches of a diameter of the cathode body bore.

23. The electrode as in claim 21, wherein said threaded engagement section is disposed between said alignment section and said contact shoulder.

24. The electrode as in claim 21, further comprising at least two concentric compressible components disposed circumferentially around said electrode at a location longitudinally spaced from said connection end.

25. The electrode as in claim 24, wherein said compressible components comprise O-rings.

26. The electrode as in claim 24, wherein each of said compressible components is seated in a respective groove, said grooves having opposite side walls of generally equal depth.

27. The electrode as in claim 26, wherein said side walls have a depth at least as great as a radius of said compressible components.

* * * * *